(No Model.)
H. MENIER.
APPARATUS FOR JOINING TELEGRAPH CABLES.
No. 604,258. Patented May 17, 1898.
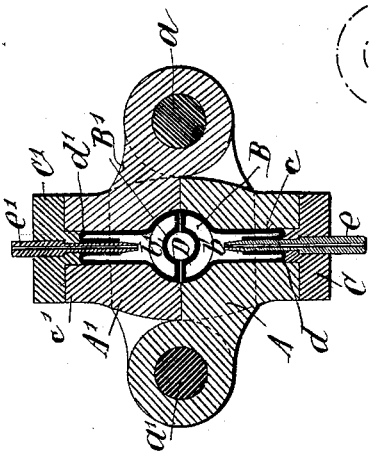
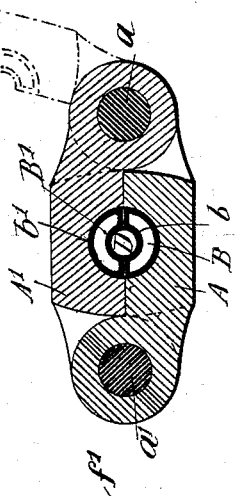
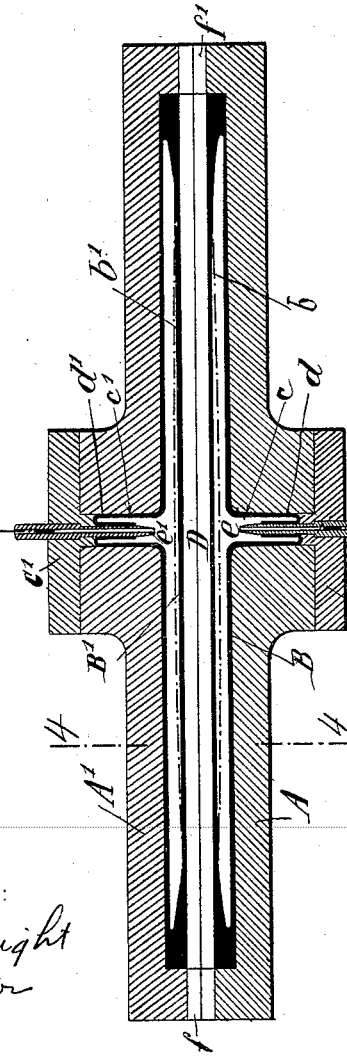
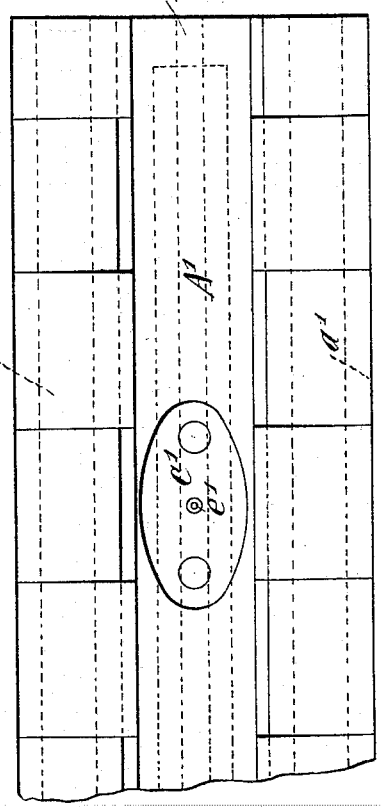
WITNESSES:
P. W. Wright
S. C. Connor
INVENTOR
HENRI MENIER
BY HIS ATTORNEYS
Howson and Howson

UNITED STATES PATENT OFFICE.

HENRI MENIER, OF PARIS, FRANCE.

APPARATUS FOR JOINING TELEGRAPH-CABLES.

SPECIFICATION forming part of Letters Patent No. 604,258, dated May 17, 1898.

Application filed December 28, 1897. Serial No. 664,032. (No model.) Patented in France May 11, 1897, No. 266,803.

*To all whom it may concern:*

Be it known that I, HENRI MENIER, a citizen of the Republic of France, residing in Paris, France, have invented certain Improvements in the Jointing of Telegraphic Cables, (for which I have obtained a French patent, dated May 11, 1897, No. 266,803,) of which the following is a specification.

This invention relates to improvements in the jointing of telegraphic cables.

The weak points in telegraphic cables are generally the joints of the dielectric which connect its lengths. These joints made by hand do not possess the homogeneity necessary to afford complete security, and their proneness to leak renders it desirable that the particles should be closer drawn or pressed together. To remedy these defects, I propose to submit the joints when they leave the workman's hands to a constant, powerful, and circumferential pressure, which agglomerates the particles, so that their absolute insulation can be obtained without using any Chatterton or other compound for this purpose and, so to speak, by "first intention." The circumferential pressure in question is obtained by means of a special apparatus, such as is shown by way of example on the annexed drawings.

Figure 1 is a longitudinal section; Fig. 2, a corresponding plan view from above. Fig. 3 is a cross-section made on line 3 3 of Fig. 1, and Fig. 4 is a cross-section on line 4 4 of Fig. 1.

The apparatus thus shown consists of a metallic box, case, or mold very strong and formed of two parts A and A', symmetrically placed together and hinged by spindles or rods $a$ and $a'$, extending through and along suitable lugs formed with or attached thereto. The rod $a$, for example, serves as a hinge when the box is opened, as shown in dotted lines on Fig. 4, while the rod $a'$ serves to lock it and prevents the separation of the two parts. These parts A and A' are hollow and inclose other hollow pieces B and B', formed of elastic, the thickness of the walls of which, notably those $b$ and $b'$, oppositely situated, increases toward the ends, as shown on Fig. 1. The hollow parts B and B' are provided with appendices or tubes $c$ and $c'$, respectively, entering the recesses $d$ and $d'$ of the box A A' and folded or wound interiorly around ajutages or pipes $e$ and $e'$, securely fastened to the covers C and C', fixed to the case or mold. The ajutages $e$ and $e'$ are connected by any suitable means with any convenient hydraulic or other compressing apparatus which will pump a suitable fluid (water, glycerin, gas, &c.) into the two hollow india-rubber parts B and B'. The closed mold presents at its ends two passages or orifices $f$ and $f'$, which unite or join in a cylindrical space D, reserved between the parts B and B', which are to be placed together.

The apparatus in question is used in the following way: When a joint has been made by hand in the usual or any ordinary manner, the case is opened by causing one part to turn on the hinge $a$, and the joint is placed in the space D, care being taken that it is placed centrally, the case is closed, and the pin $a'$ replaced. It will be remarked that the part of the enlarged joint slightly presses outward the opposite walls of the parts B and B', as I have shown in dot and peck lines on Fig. 1. When this has been done, hydraulic pressure is introduced into the said parts B and B', which latter tends to expand them and consequently to operate on the joint, the insulating matter of which is found to be strongly and regularly compressed onto the copper conductor without liquid being able to reach the insulator and that whatever be the pressure given. This pressure is maintained during the time necessary for the cooling and setting of the insulating material, which may be obtained by allowing the apparatus to stand in the open or a current of air or by plunging it into a cooling mixture. Under the influence of compression all the particles are jointed closely together.

It will be remarked that the pressure is maintained in the parts B and B', due to the joints formed by the folding of the appendices $c\ c'$ on the ajutages $e\ e'$, which may be provided with any suitable valves.

It is understood that I do not limit myself to the shapes or sizes shown on the drawings and that I reserve to myself the right of constructing the apparatus of any suitable material and of modifying, when desired, the details of its construction or working.

With this apparatus it is further possible to cause by pressure insulating materials to enter the joint by altering the elastic chamber, by allowing only its ends to remain, and by causing the insulating material to enter by the pipes or conduits $e$ and $e'$.

I claim as my invention—

1. The apparatus above described for completing telegraphic cable-joints, comprising an elastic cylinder to inclose the cable-joint, hollow chambers about the cylinder and means for admitting fluid-pressure to the chambers to compress the cable-joint, substantially as described.

2. The apparatus above described which consists in the combination of a metal box or case in two parts with hollow elastic inclosures between which is placed the joint to be operated upon, and in which the compression takes place, as and for the purposes described.

3. The apparatus above described, comprising a metal box or case in two parts, elastic pieces inclosed therein, means for fastening the parts of the case together, and means for admitting fluid to the interior when jointed, substantially as described.

4. The apparatus above described, comprising a box or case in two parts, means for uniting them together, and hollow elastic inclosures with thickened ends and means for admitting fluid-pressure to the hollow elastic inclosures, as and for the purpose described.

In testimony whereof I have signed my name to this specification in the presence of two subscribing witnesses.

HENRI MENIER.

Witnesses:
 LÉON FRANCKEN,
 EDWARD P. MACLEAN.